(12) United States Patent
Saruwatari

(10) Patent No.: US 7,630,141 B2
(45) Date of Patent: Dec. 8, 2009

(54) ZOOM LENS AND IMAGE PICKUP APPARATUS HAVING THE ZOOM LENS

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/264,911

(22) Filed: Nov. 5, 2008

(65) Prior Publication Data
US 2009/0116120 A1 May 7, 2009

(30) Foreign Application Priority Data
Nov. 5, 2007 (JP) .............................. 2007-287273

(51) Int. Cl.
*G02B 15/14* (2006.01)
(52) U.S. Cl. ....................... 359/686; 359/683
(58) Field of Classification Search ................. 359/676, 359/683, 686
See application file for complete search history.

(56) References Cited

U.S. PATENT DOCUMENTS

| | | | |
|---|---|---|---|
| 5,687,401 A | 11/1997 | Kawamura | |
| 6,404,561 B1 | 6/2002 | Isono | |
| 6,763,186 B2 * | 7/2004 | Hamano | 396/79 |
| 7,177,092 B2 | 2/2007 | Satori | |
| 7,218,458 B2 | 5/2007 | Saruwatari | |
| 7,336,419 B2 | 2/2008 | Yamada | |
| 2003/0076591 A1 | 4/2003 | Ohmori | |
| 2005/0270661 A1 * | 12/2005 | Nanba et al. | 359/676 |

FOREIGN PATENT DOCUMENTS

| | | |
|---|---|---|
| JP | 11-352401 | 12/1999 |
| JP | 2002-228931 | 8/2004 |

* cited by examiner

*Primary Examiner*—Scott J Sugarman
(74) *Attorney, Agent, or Firm*—Canon USA Inc IP Div

(57) ABSTRACT

A zoom lens includes, in order from an object side to an image side, a first lens unit having a positive refractive power and configured to move along an optical axis during zooming, a second lens unit having a negative refractive power and configured to move with a locus convex towards the image side during zooming, a third lens unit having a positive refractive power, and a fourth lens unit having a negative refractive power. The first lens unit is located closer to the object side at a telephoto end than at a wide-angle end and the second lens unit is located closer to the image side at the telephoto end than at the wide-angle end. A focal length of the second lens unit (f2), a focal length of the zoom lens at the wide-angle end (fw), and a focal length of the zoom lens at the telephoto end (ft) are appropriately set.

11 Claims, 13 Drawing Sheets

ZOOM LENS AND IMAGE PICKUP APPARATUS HAVING THE ZOOM LENS

BACKGROUND OF THE INVENTION

1. Field of the Invention

The present invention relates to a zoom lens and an image pickup apparatus having the zoom lens. More specifically, the present invention relates to a zoom lens and an image pickup apparatus, such as a video camera, a digital still camera, and a television camera, and a silver-halide film camera having the zoom lens.

2. Description of the Related Art

In recent years, an image pickup apparatus has a high functional performance and is small in size. Accordingly, it is desired by the market that a photographic optical system used in such an image pickup apparatus has a high resolution and a high zoom ratio and that the entire length of the lens unit is short.

A positive lead type zoom lens, whose lens unit located closest to the object side has a positive refractive power, can relatively easily achieve a high zoom ratio with a small entire lens unit size.

In this regard, U.S. Pat. No. 5,687,401 and Japanese Patent Application Laid-Open No. 11-352401 each discuss a positive lead type four-unit zoom lens. The zoom lens includes four lens units, namely, in order from the object side to the image side, a lens unit having a positive refractive power, a lens unit having a negative refractive power, a lens unit having a positive refractive power, and a lens unit having a negative refractive power, and performs zooming by moving a plurality of lens units.

Furthermore, U.S. Pat. Nos. 6,404,561, 7,177,092, 7,218,458, U.S. Patent Application Publication No. US 2003/0076591 A1, and Japanese Patent Application Laid-Open No. 2002-228931 each discuss a positive lead type five-unit zoom lens. The zoom lens includes five lens units, namely, in order from the object side to the image side, a lens unit having a positive refractive power, a lens unit having a negative refractive power, a lens unit having a positive refractive power, a lens unit having a negative refractive power, and a lens unit having a positive refractive power, and performs zooming by moving a plurality of lens units.

In the case of using a five-unit zoom lens, the vertical position (height) of an off-axis ray passing through the front lens can be lowered compared to that in the case of using a four-unit zoom lens. Accordingly, in this case, the front lens diameter can be reduced while achieving a high zoom ratio.

In addition, U.S. Pat. No. 7,336,419 discusses a positive lead type five-unit zoom lens, which is capable of correcting an image shake occurring when the zoom lens unit is vibrated by moving the third lens unit in the direction perpendicular to the optical axis.

Generally, in order to achieve a zoom lens having a predetermined zoom ratio and whose entire size is small, it is useful to increase a refractive power of each lens unit constituting the zoom lens with a reduced number of lens elements.

However, in this case, the lens thickness of the lens constituting the zoom lens may increase if the refractive power of each surface of the zoom lens is increased. Thus, the entire size of the lens cannot be appropriately reduced. Accordingly, in this case, it is difficult to correct various aberrations.

Furthermore, in this case, the amount of error, e.g., tilting of the lens or lens unit, occurring when retracting each lens unit at the time of nonuse of a camera may become large. If the sensitivity of the lens or lens unit is high, an optical performance may degrade or an image shake may occur during zooming.

Therefore, with respect to a zoom lens, it is useful that the lens or lens unit has as low a sensitivity as possible to achieve a high optical performance. In the case of a positive lead type zoom lens, in order to achieve a high optical performance and a high zoom ratio at the same time as well as to achieve a small-sized zoom lens, it is necessary to apply an appropriate setting for each component of the zoom lens.

More specifically, it is necessary to appropriately set a zoom type (the number of lens units and the refractive power of each lens unit), a moving locus of moving of each lens unit during zooming, and a magnification allocation for each lens unit.

If these settings are not appropriate, the entire zoom lens may become large-sized to achieve a high zoom ratio. Furthermore, in this case, variation of various aberrations occurring during zooming may increase. Therefore, it becomes very difficult to achieve a high optical performance over the entire zooming range and the entire image plane.

SUMMARY OF THE INVENTION

The present invention is directed to a zoom lens whose entire size is small, capable of achieving a high zoom ratio and having a high optical performance over the entire zooming range from the wide-angle end to the telephoto end, and is directed to an image pickup apparatus using the zoom lens.

According to an aspect of at least one exemplary embodiment of the present invention, a zoom lens includes, in order from an object side to an image side, a first lens unit having a positive refractive power and configured to move along an optical axis during zooming, a second lens unit having a negative refractive power and configured to move with a locus convex towards the image side during zooming, a third lens unit having a positive refractive power, and a fourth lens unit having a negative refractive power. The first lens unit is located closer to the object side at a telephoto end than at a wide-angle end, and the second lens unit is located closer to the image side at the telephoto end than at the wide-angle end. A focal length of the second lens unit (f2), a focal length of the zoom lens at the wide-angle end (fw), and a focal length of the zoom lens at the telephoto end (ft) satisfy the following condition:

$$-0.7 < f2/\sqrt{(fw \cdot ft)} < -0.2.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DETAILED DESCRIPTION OF THE EMBODIMENTS

Figure 1:
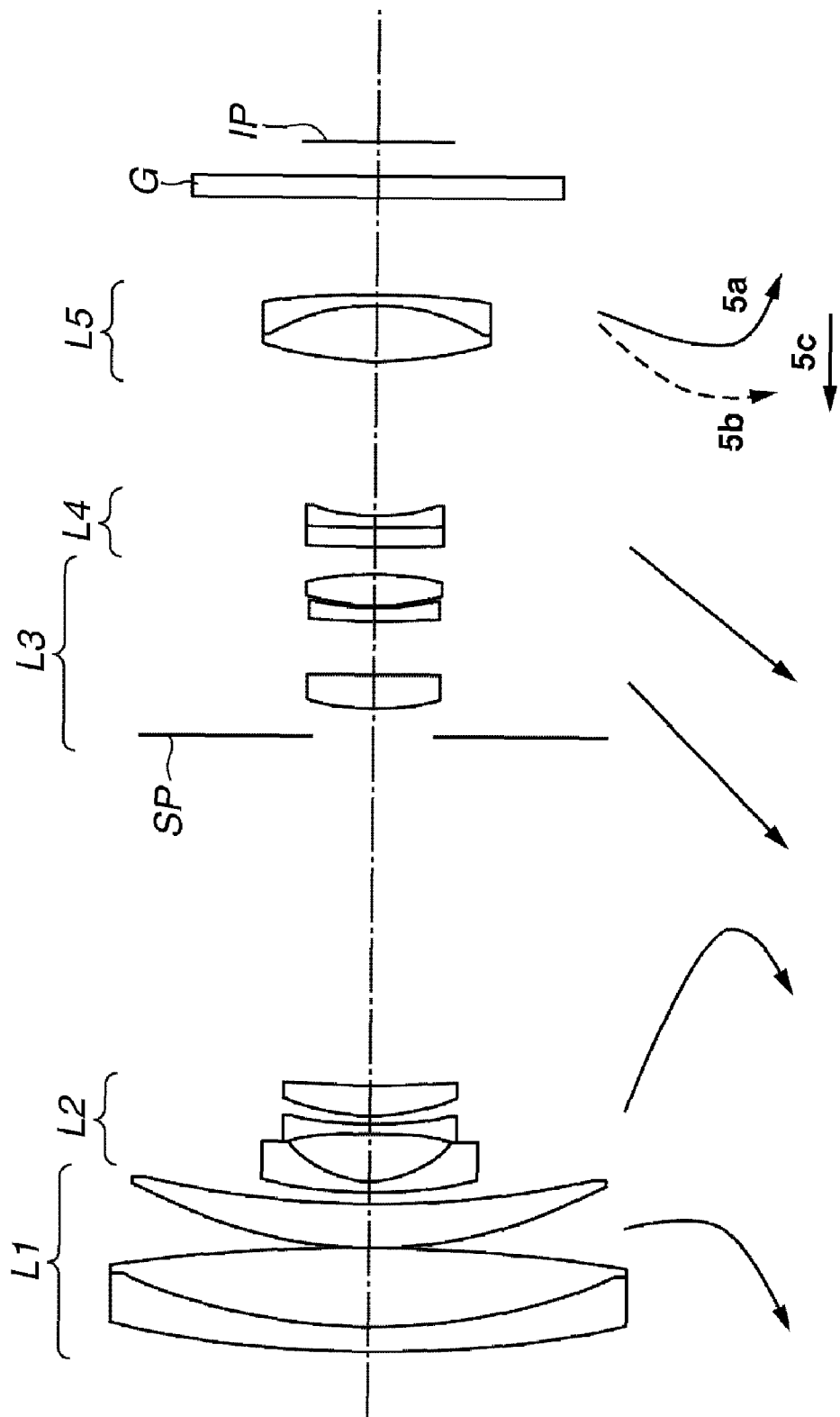
FIG. 1 is a lens cross section illustrating a zoom lens at the wide-angle end according to a first exemplary embodiment of the present invention.
Figure 2:
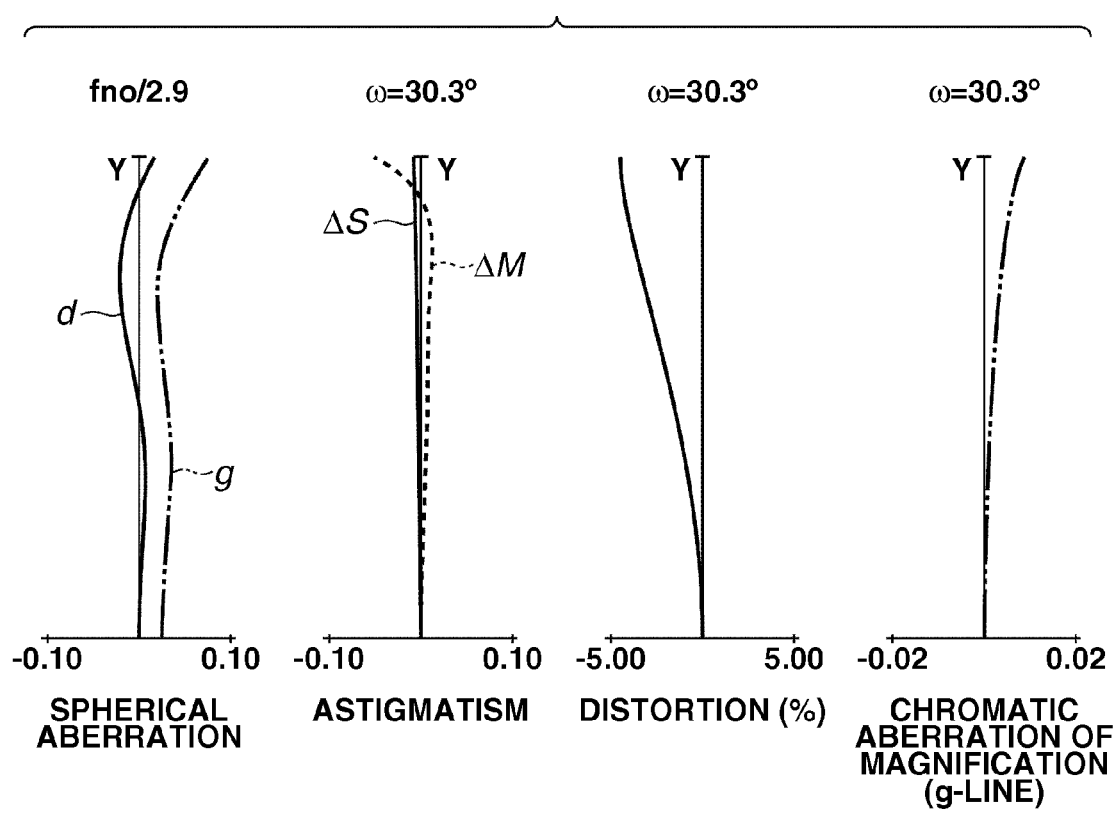
FIG. 2 is an aberration chart for the zoom lens at the wide-angle end in numerical example 1 corresponding to the first exemplary embodiment of the present invention.
Figure 3:
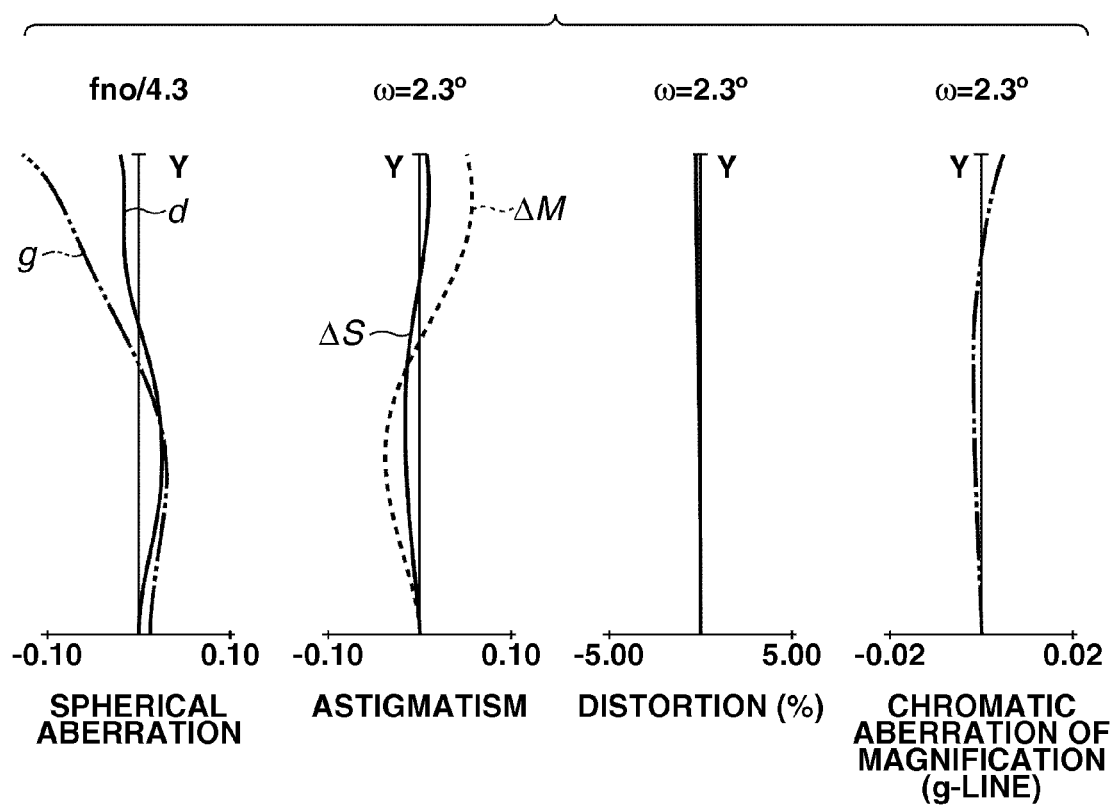
FIG. 3 is an aberration chart for the zoom lens at the telephoto end in numerical example 1 corresponding to the first exemplary embodiment of the present invention.

Various exemplary embodiments, features, and aspects of the present invention will be described in detail below with reference to the drawings. It is to be noted that the relative arrangement of the components, the numerical expressions, and numerical values set forth in these embodiments are not intended to limit the scope of the present invention.

A zoom lens according to an exemplary embodiment of the present invention includes, in order from the object side to the image side, at least four lens units, namely, a first lens unit having a positive refractive power configured to move along an optical axis during zooming, a second lens unit having a negative refractive power configured to move with a locus convex towards the image side during zooming, a third lens unit having a positive refractive power, and a fourth lens unit having a negative refractive power.

The zoom lens according to an exemplary embodiment of the present invention is a photographic lens system used in an image pickup apparatus, such as a video camera, a digital camera, or a silver-halide film camera.

In each lens cross section, the left portion of the drawing is an object side and the right portion thereof is an image side. The zoom lens according to an exemplary embodiment can be used as a projection lens of a projector. In this case, the left portion of each lens cross section is a screen side and the right portion of each lens cross section corresponds to a projection image side.

In each lens cross section, the zoom lens includes a first lens unit L1 having a positive refractive power (optical power: reciprocal of the focal length), a second lens unit L2 having a negative refractive power, a third lens unit L3 having a positive refractive power, a fourth lens unit L4 having a negative refractive power, and a fifth lens unit L5 having a positive refractive power.

An aperture stop SP is located on the object side of the third lens unit L3. "G" denotes an optical block, such as an optical filter, a face plate, a crystal low-pass filter, or an infrared ray cut-off filter.

"IP" denotes an image plane. In the case of using the zoom lens as a photographic optical system for a video camera or a digital still camera, a photosensitive surface, which is equivalent to a film surface of a silver-halide film camera, is located on an imaging plane of a solid-state image sensor (photoelectric conversion element), such as a charge-coupled device (CCD) sensor or a complementary metal-oxide semiconductor (CMOS) sensor.

In each of the aberration charts, "d" denotes d-line light and "g" denotes g-line light. "ΔM" denotes a meridional image surface. "ΔS" denotes a sagittal image surface. Chromatic aberration of magnification is expressed with g-line light. "ω" denotes a half angle of view. "Fno" denotes F-number.

The Y-axis in the spherical aberration's graph is entrance pupil radius, and the Y-axis in the astigmatism's, distortion's, and chromatic aberration of magnification's graphs is image height.

Note that the "wide-angle end" and the "telephoto end" each refer to a zoom position at which a magnifying lens unit is located at an edge of a range in which it is mechanically movable along the optical axis.

Figure 4:
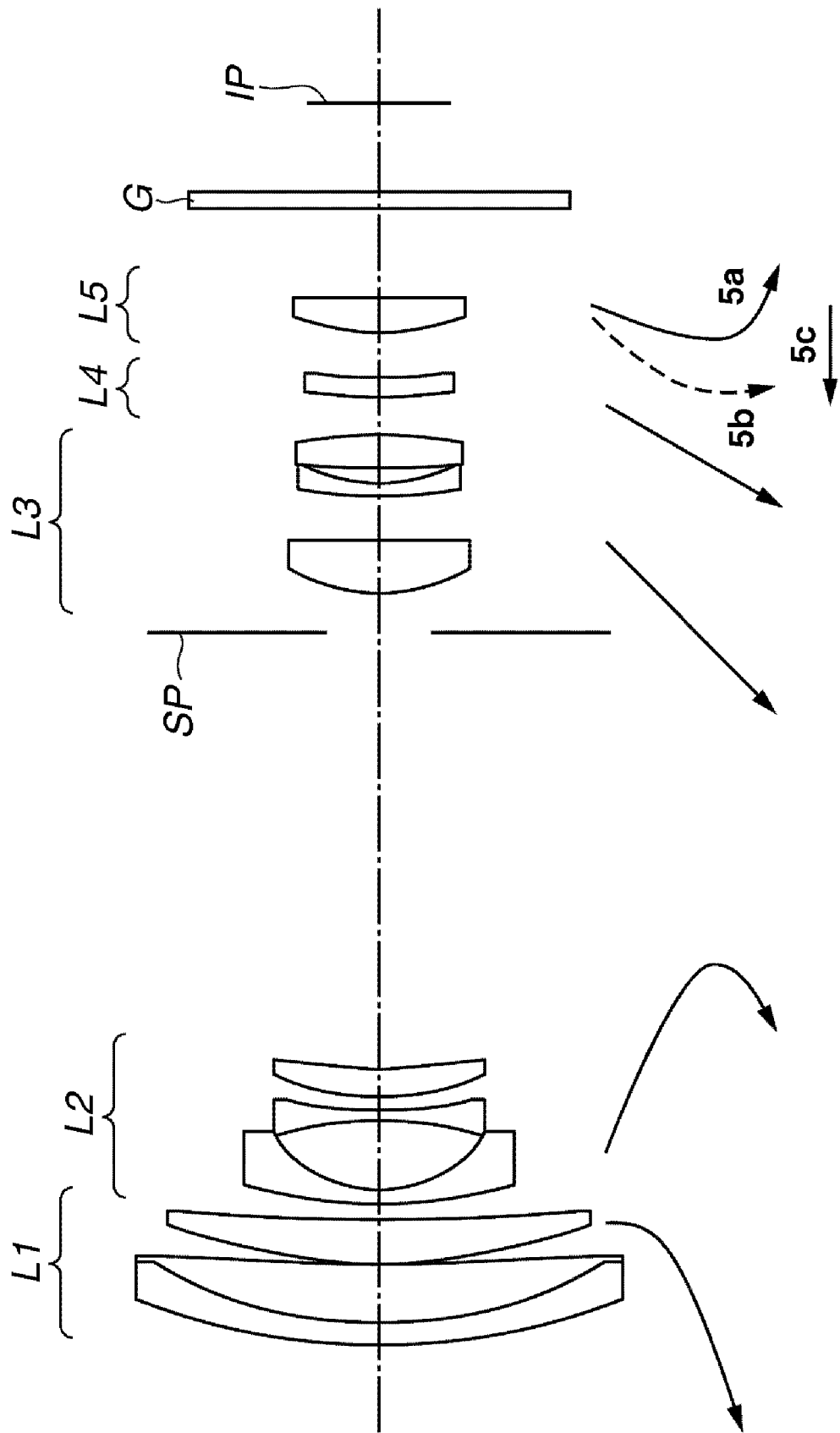
FIG. 4 is a lens cross section illustrating a zoom lens at the wide-angle end according to a second exemplary embodiment of the present invention.
Figure 5:
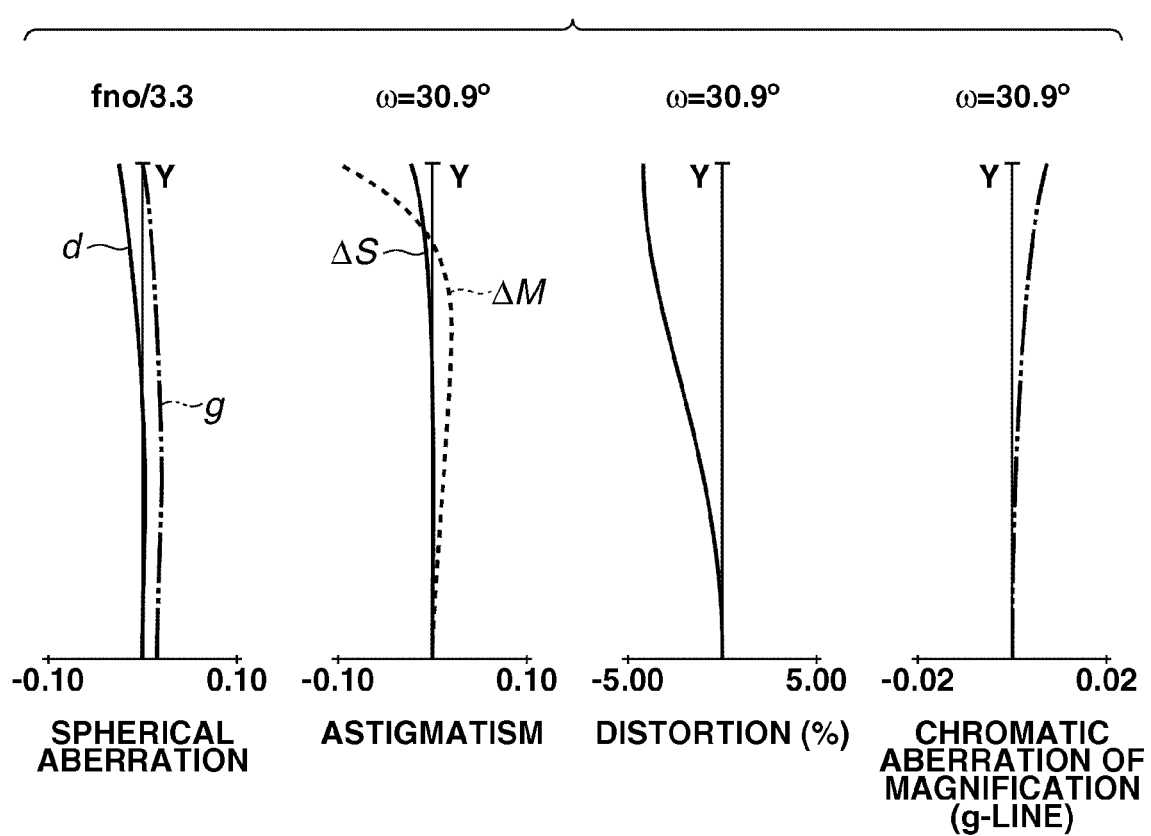
FIG. 5 is an aberration chart for the zoom lens at the wide-angle end in numerical example 2 corresponding to the second exemplary embodiment of the present invention.
Figure 6:
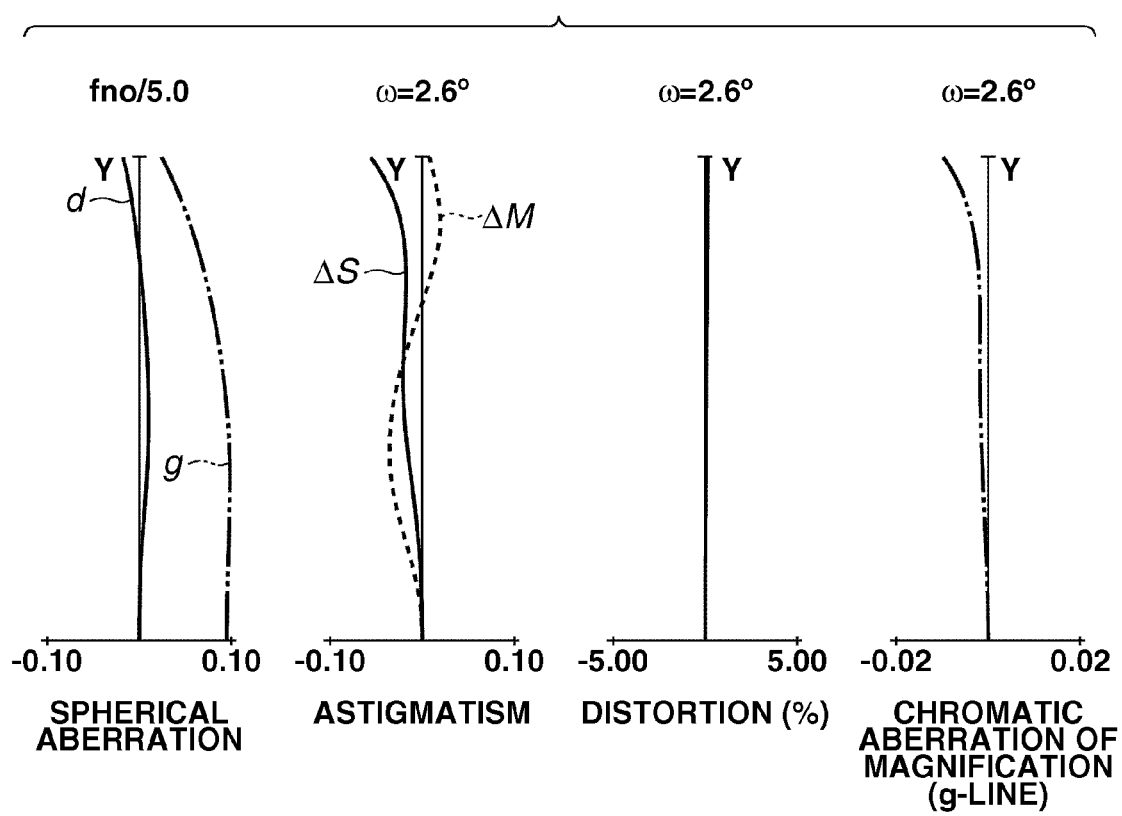
FIG. 6 is an aberration chart for the zoom lens at the telephoto end in numerical example 2 corresponding to the second exemplary embodiment of the present invention.

In an exemplary embodiment, each lens unit is moved during zooming from the wide-angle end to the telephoto end as indicated with an arrow. More specifically, in the first and second exemplary embodiments, the first lens unit L1 moves with a locus convex towards the image side during zooming from the wide-angle end to the telephoto end, as illustrated in FIG. 1 and FIG. 4.

In addition, the second lens unit L2 moves with a locus convex towards the image side.

Moreover, the third lens unit L3 moves towards the object side. The fourth lens unit L4 moves towards the object side. The fifth lens unit L5 moves with a locus convex towards the object side. The aperture stop SP moves integrally with the third lens unit L3 during zooming.

Furthermore, an exemplary embodiment of the present invention employs a rear focus type focusing method. The "rear focus type focusing method" refers to a method for performing focusing by moving the fifth lens unit L5 along the optical axis. During focusing from an infinitely-distant object to a closest object at the telephoto end, the fifth lens unit L5 is caused to move forward as indicated with an arrow 5c.

Curves 5a and 5b each indicate a moving locus along which the fifth lens unit L5 is actually moved for correcting variation of the image plane, which may occur during zooming from the wide-angle end to the telephoto end at the time of focusing on an infinitely-distant object and a closest object, respectively.

Figure 7:
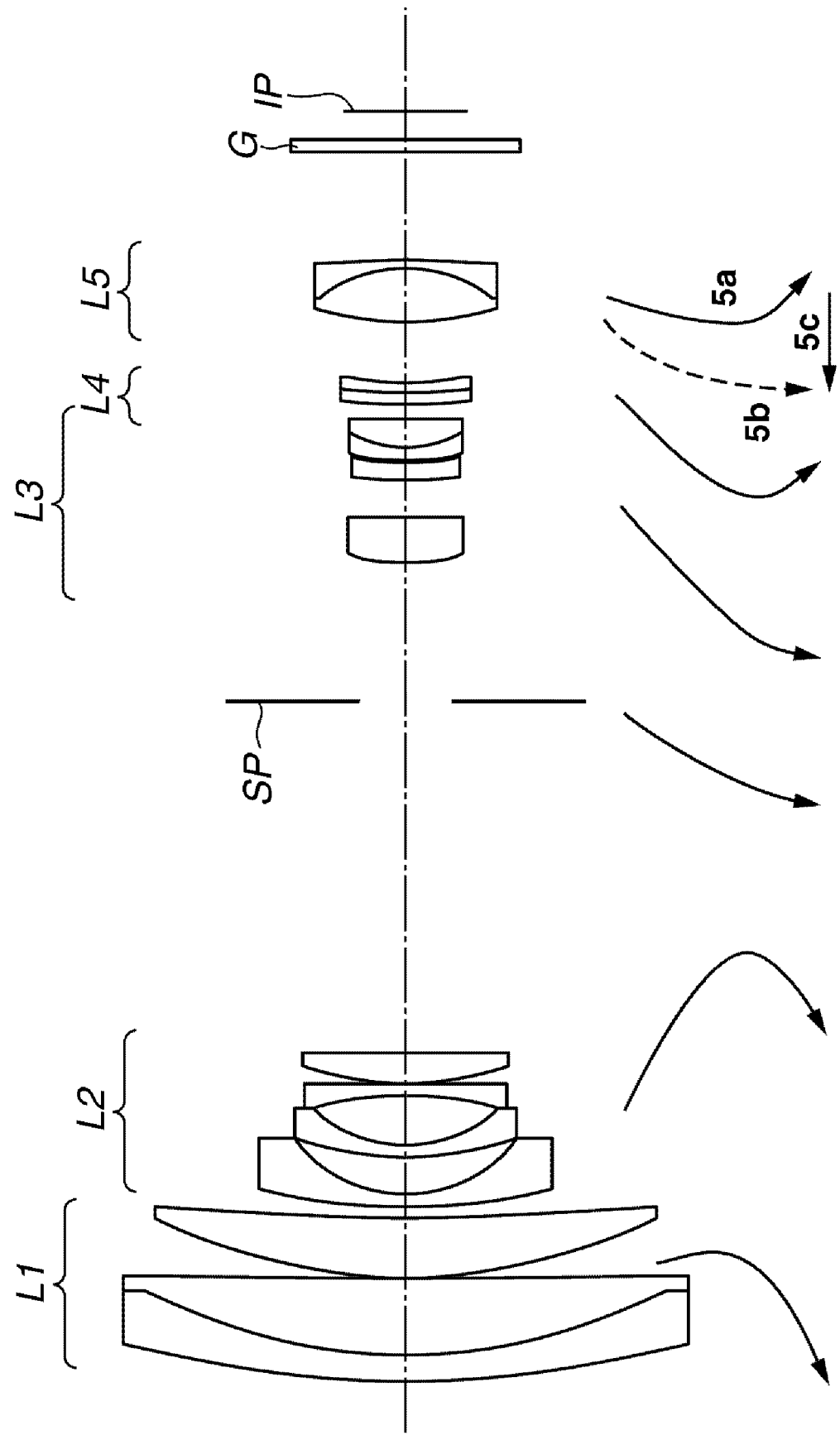
FIG. 7 is a lens cross section illustrating a zoom lens at the wide-angle end according to a third exemplary embodiment of the present invention.
Figure 8:
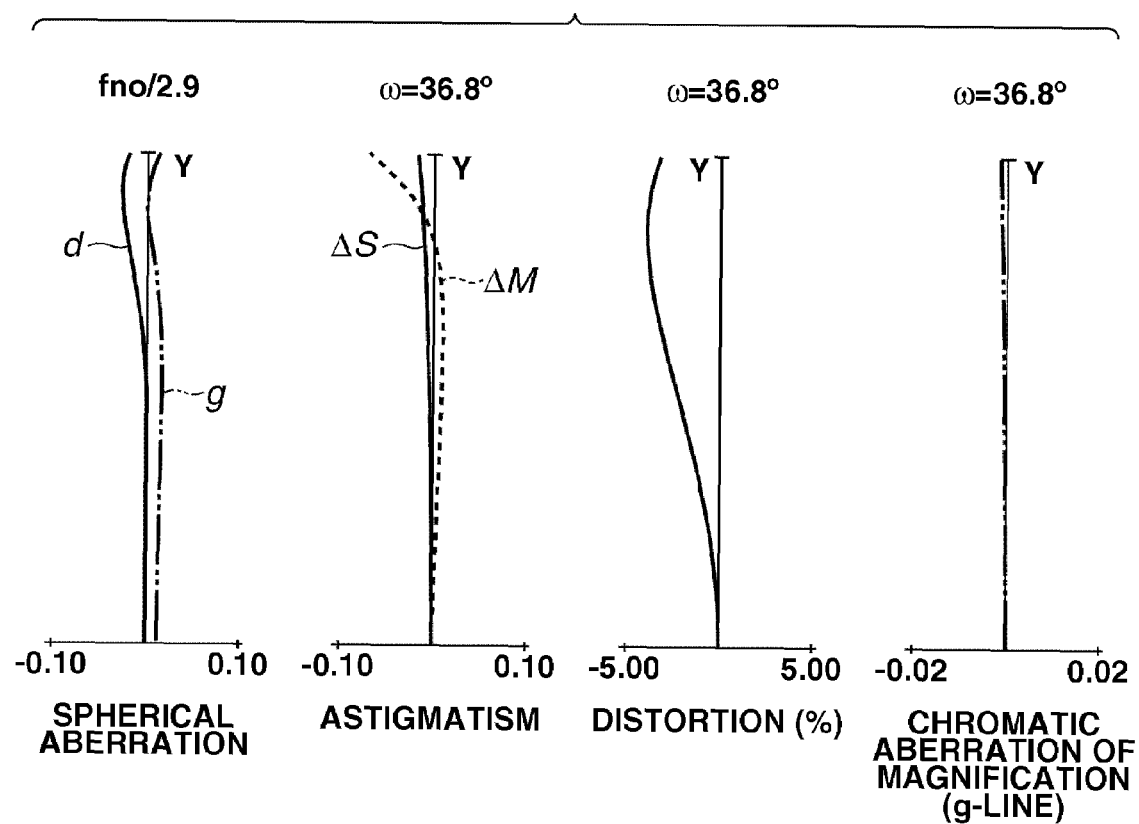
FIG. 8 is an aberration chart for the zoom lens at the wide-angle end in numerical example 3 corresponding to the third exemplary embodiment of the present invention.
Figure 9:
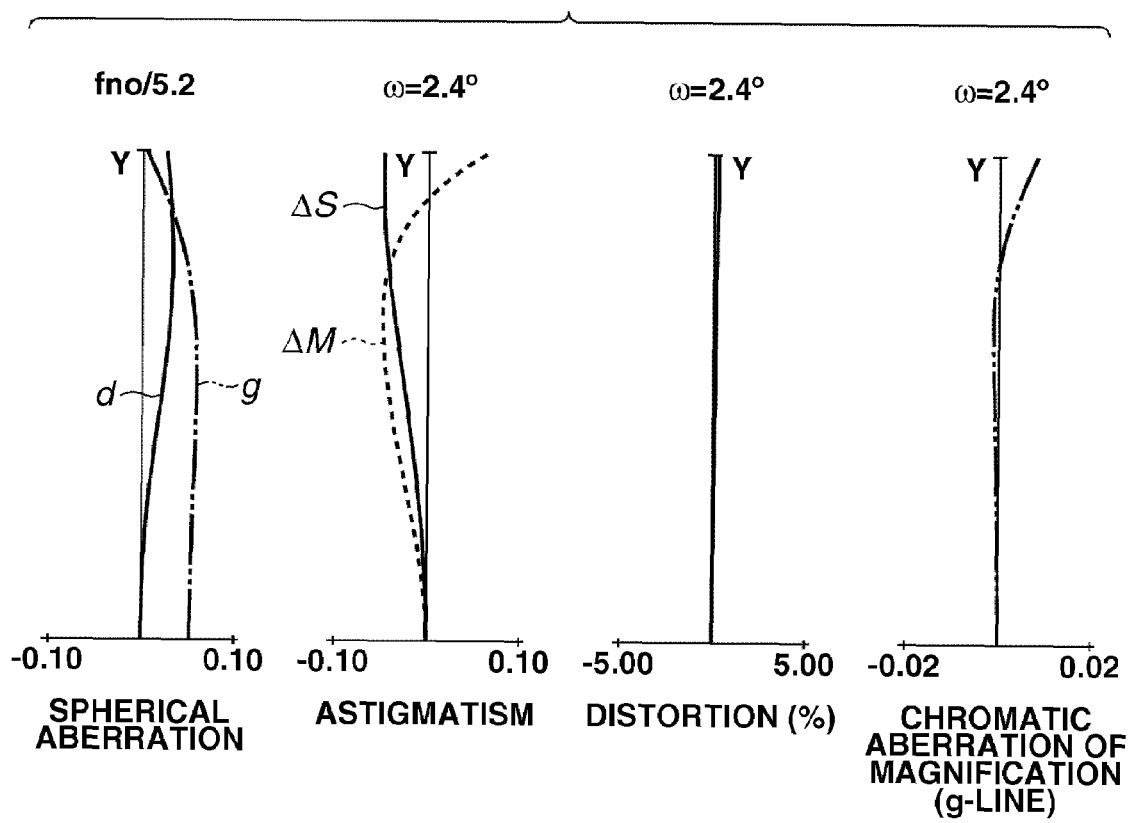
FIG. 9 is an aberration chart for the zoom lens at the telephoto end in numerical example 3 corresponding to the third exemplary embodiment of the present invention.

In the third exemplary embodiment illustrated in FIG. 7, the first lens unit L1 moves with a locus convex towards the image side during zooming from the wide-angle end to the telephoto end as illustrated with an arrow in FIG. 7.

In addition, the second lens unit L2 moves with a locus convex towards the image side. Moreover, the third lens unit L3 moves towards the object side. The fourth lens unit L4 and the fifth lens unit L5 move with a locus convex towards the object side.

The aperture stop SP moves towards the object side independently from the lens units. The fifth lens unit L5 moves to perform focusing.

The moving locus with which the fifth lens unit L5 moves for focusing is similar to that in the first and second exemplary embodiments.

Figure 10:
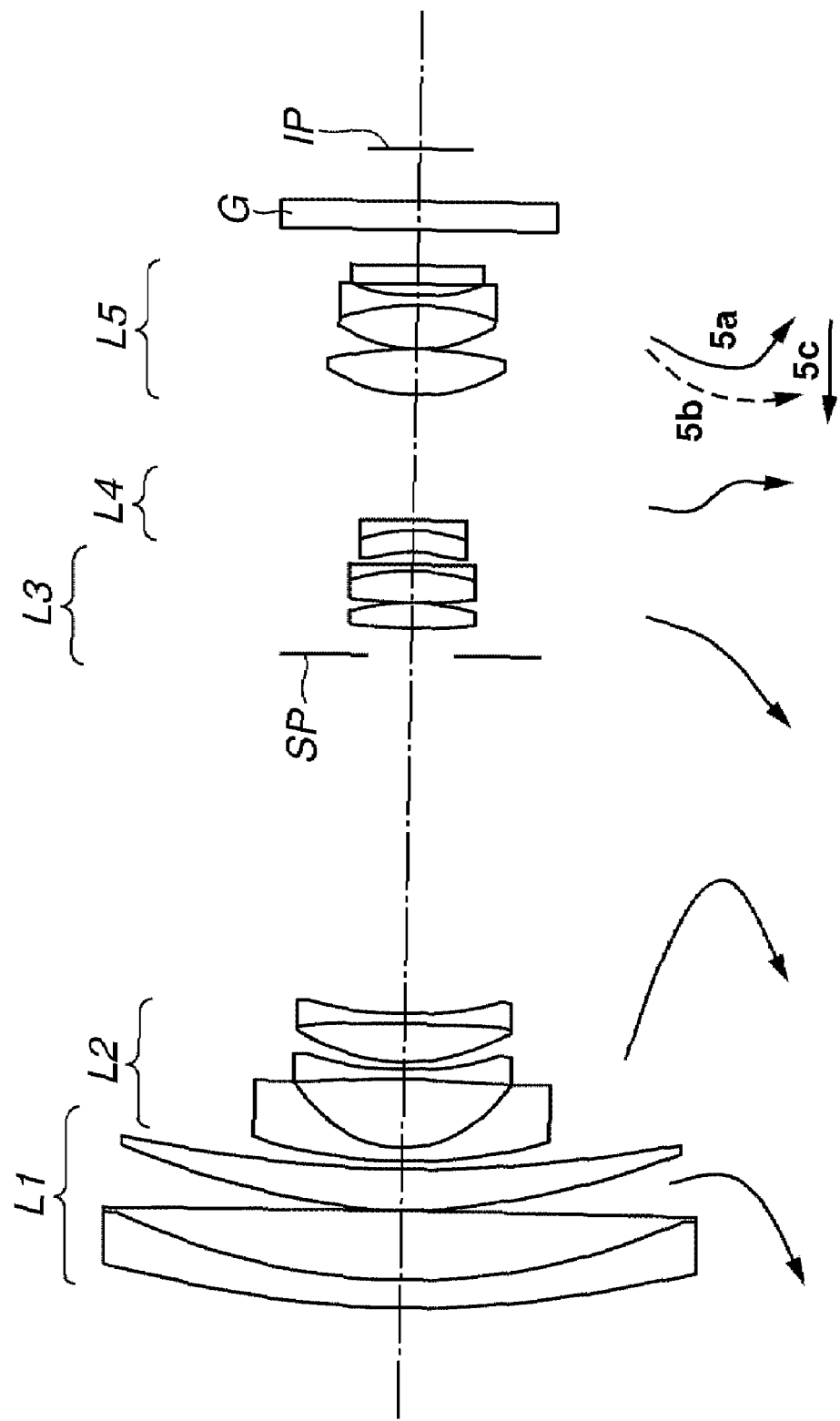
FIG. 10 is a lens cross section illustrating a zoom lens at the wide-angle end according to a fourth exemplary embodiment of the present invention.
Figure 11:
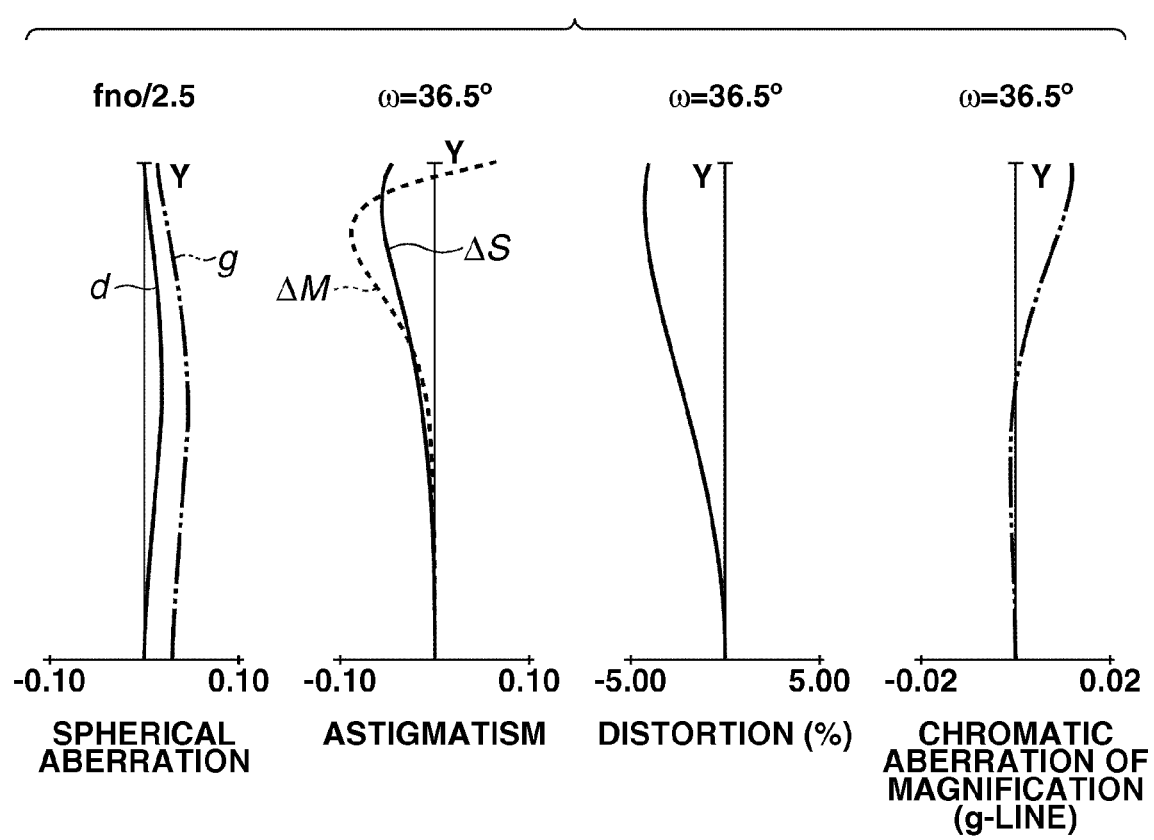
FIG. 11 is an aberration chart for the zoom lens at the wide-angle end in numerical example 4 corresponding to the fourth exemplary embodiment of the present invention.
Figure 12:
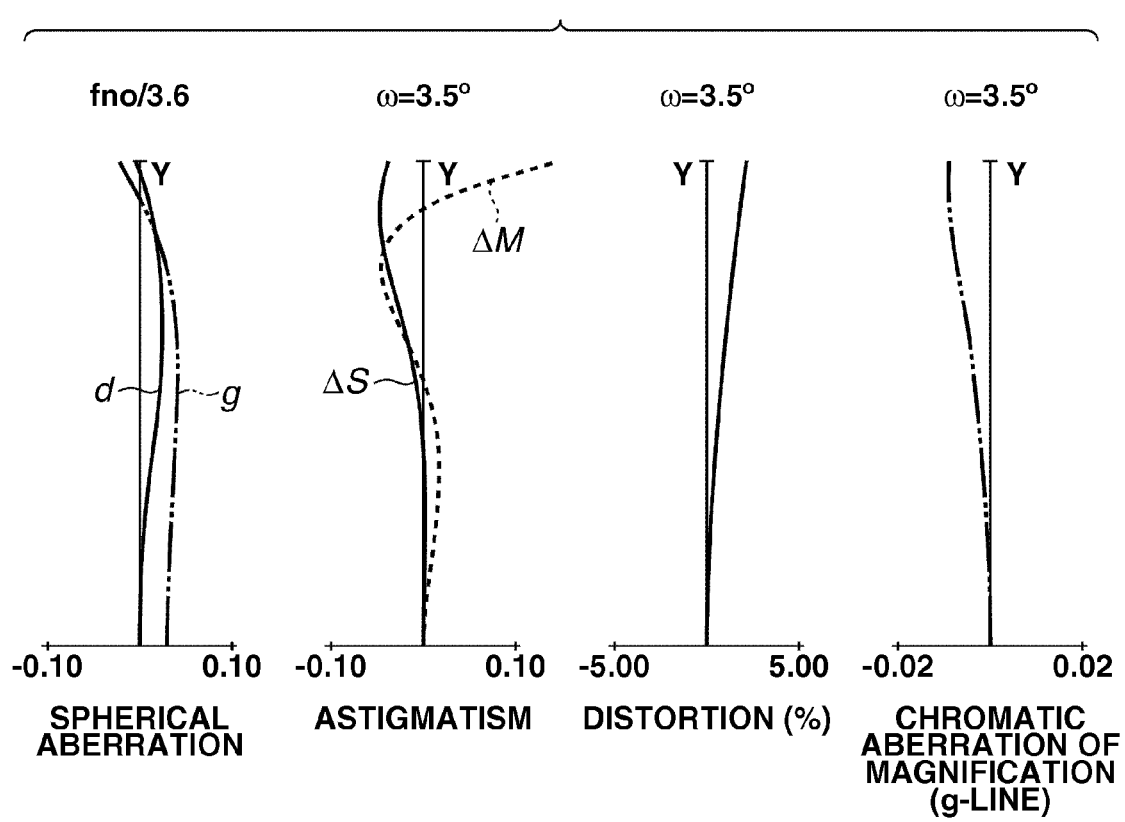
FIG. 12 is an aberration chart for the zoom lens at the telephoto end in numerical example 4 corresponding to the fourth exemplary embodiment of the present invention.

The fourth exemplary embodiment illustrated in FIG. 10 is different from the first and second exemplary embodiments (FIGS. 1 and 4) in the point that in the fourth exemplary embodiment, the fourth lens unit L4 moves nonlinearly towards the image side during zooming from the wide-angle end to the telephoto end. Other points of the configuration of the fourth exemplary embodiment are similar to those in the first and second exemplary embodiments.

In an exemplary embodiment, the first lens unit L1 and the third lens unit L3 are located closer to the object side at the telephoto end than at the wide-angle end. Thus, the entire lens length can be reduced at the wide-angle end while achieving a high zoom ratio.

At this time, the second lens unit L2 moves with a locus convex towards the image side. Thus, a moving stroke for the third lens unit L3 is secured.

In an exemplary embodiment, the third lens unit L3 moves towards the object side during zooming. Thus, the third lens unit L3 and the fourth lens unit L4 bear the magnification allocation.

Further, the first lens unit L1, having a positive refractive power, moves towards the object side so that the second lens unit L2 can exert a high variable magnification effect.

Thus, the zoom lens according to an exemplary embodiment of the present invention can achieve a high zoom ratio without much increasing the refractive power of each of the first lens unit L1 and the second lens unit L2.

Furthermore, an exemplary embodiment employs a rear focusing method. That is, in an exemplary embodiment, the fifth lens unit L5, which is light in weight, moves along the optical axis to perform focusing.

In an exemplary embodiment, the light-weighted fifth lens unit L5 moves for focusing. Accordingly, an exemplary embodiment can easily perform quick focusing (for example, automatic focusing).

Moreover, a lens unit to be selected as a unit for performing focusing is not limited to the fifth lens unit L5. That is, an exemplary embodiment of the present invention can be implemented by moving the fourth lens unit L4 along the optical axis.

In an exemplary embodiment, the third lens unit L3 is movable so that the third lens unit L3 has a component perpendicular to the optical axis. Accordingly, an image shake occurring when the entire optical system is vibrated can be corrected.

With the above-described configuration, an exemplary embodiment can perform image stabilization without using any additional optical member (a variable angle prism, for example) or an additional lens unit for image stabilization. Therefore, an exemplary embodiment can prevent the entire zoom lens from becoming large-sized. Note that in the first, second, and fourth exemplary embodiments, the aperture stop SP moves integrally with the third lens unit L3 during zooming.

Accordingly, the number of lens units, which may be required according to whether they serve as a movable lens unit or a stationary lens unit, can be reduced.

On the other hand, in the third exemplary embodiment, the aperture stop SP moves independently from the third lens unit L3 during zooming. Thus, the position of the entrance pupil in an area in which the angle of view is wide can be close to the object side. Accordingly, the front lens diameter (the effective diameter of the first lens unit L1) can be kept small.

Note that in the case where the aperture stop SP is stationary, it is not necessary to move a diaphragm unit. Accordingly, this configuration can be advantageous in terms of power saving because in this case, a driving torque for driving an actuator that drives the diaphragm unit during zooming can be set low.

A lens configuration of each lens unit is described below.

To begin with, the first lens unit L1 is described. The effective lens diameter of the first lens unit L1 can be relatively large. Accordingly, it is more useful to use as small a number of lens elements as possible in terms of reducing the size and weight of the entire lens unit.

In an exemplary embodiment, the first lens unit L1 includes three lenses, namely, a cemented lens composed of a negative lens and a positive lens and another positive lens. With this configuration, the zoom lens according to an exemplary embodiment of the present invention can reduce or suppress spherical aberration and chromatic aberration occurring when the zoom ratio is increased.

The second lens unit L2 is described next. In the first and second exemplary embodiments, the second lens unit L2 includes three mutually independent lens units, namely, a meniscus-shaped negative lens whose lens surface on the object side has a convex shape, a negative lens both of whose lens surfaces have a concave shape, and a positive lens whose surface on the object side has a convex shape. With this configuration, the zoom lens according to an exemplary embodiment of the present invention can reduce variation of aberration occurring during zooming. In particular, distortion occurring at the wide-angle end and spherical aberration occurring at the telephoto end can be effectively corrected.

In the third exemplary embodiment, the second lens unit L2 includes three negative lenses and one positive lens in order from the object side. With the above-described configuration, the zoom lens according to an exemplary embodiment of the present invention can effectively correct off-axis aberration and is useful to increase the angle of view at the wide-angle end.

In the fourth exemplary embodiment, the second lens unit L2 includes two negative lenses and a cemented lens composed of a positive lens and a negative lens in order from the object side. With the above-described configuration, the zoom lens according to an exemplary embodiment of the present invention can effectively reduce variation of chromatic aberration during zooming.

The third lens unit L3 is described next. In the first, second, and third exemplary embodiments of the present invention, the third lens unit L3 includes two positive lenses and a negative lens whose surface facing the image side has a concave shape. With this configuration, a principal point distance between the second lens unit L2 and the third lens unit L3 can be reduced. Accordingly, the length of the lens portion from the third lens unit L3 to the fifth lens unit L5 can be reduced.

In addition, in the first, second, and third exemplary embodiments, the third lens unit L3 includes one or more aspheric surfaces. With this configuration, the zoom lens can effectively correct variation of aberration caused by zooming.

Furthermore, in the third exemplary embodiment, a cemented lens composed of a negative lens and a positive lens is included in the third lens unit L3. With this configuration, the zoom lens can reduce variation of chromatic aberration caused by zooming. Moreover, the zoom lens can reduce aberration occurring due to decentering at the time of image stabilization by decentering the third lens unit L3 from the optical axis.

In the fourth exemplary embodiment, unlike the other exemplary embodiments of the present invention, the third lens unit L3 includes a positive lens and a cemented lens. The cemented lens is composed of a positive lens and a meniscus negative lens having a convex shape facing the image side. With this configuration, in the fourth exemplary embodiment, aberration of an on-axis light flux can be effectively corrected and F-number can be decreased.

The fourth lens unit L4 is described next. In the first through fourth exemplary embodiments, the fourth lens unit L4 includes one negative lens whose surface on the object side has a convex shape or a cemented lens composed of a positive lens and a negative lens. In the fourth exemplary embodiment, the fourth lens unit L4 has an aspheric surface. Thus, variation of aberration occurring during zooming can be reduced by the aspheric surface.

The fifth lens unit L5 is described next. In the case where the fifth lens unit L5 includes one positive lens, the positive lens is made of a glass material having a low dispersion characteristic. With this configuration, variation of chromatic aberration occurring during focusing can be reduced. On the other hand, in the case where the fifth lens unit L5 includes two or more lenses, the fifth lens unit L5 can include a cemented lens to reduce variation of chromatic aberration occurring during focusing.

With the above-described configuration, an exemplary embodiment of the present invention can achieve a zoom lens having a high zoom ratio, whose front lens diameter is small, whose retracted lens length is short, and whose entire size is small.

In addition, with the above-described configuration, an exemplary embodiment of the present invention can achieve a zoom lens having a high zoom ratio, whose entire size is small.

It is further useful if an exemplary embodiment satisfies at least one of the following conditions. In this case, an effect corresponding to each condition can be obtained.

In the conditions, f2 denotes a focal length of the second lens unit L2, fw denotes a focal length of the entire zoom lens at the wide-angle end, ft denotes a focal length of the entire zoom lens at the telephoto end, β2 denotes a ratio (β2t/β2w) of an imaging magnification (β2t) of the second lens unit L2 at the telephoto end to an imaging magnification (β2w) of the second lens unit L2 at the wide-angle end, β3 denotes a ratio (β3t/β3w) of an imaging magnification (β3t) of the third lens unit L3 at the telephoto end to an imaging magnification (β3w) of the third lens unit L3 at the wide-angle end, m1 denotes an amount of movement of the first lens unit L1 during zooming from the wide-angle end to the telephoto end, m2 denotes an amount of movement of the second lens unit L2 during zooming from the wide-angle end to the telephoto end, where the amount of movement is a difference between a position of the moving lens unit with respect to the image plane at the wide-angle end and a position of the moving lens unit with respect to the image plane at the telephoto end and its sign is positive when the position is displaced to the image side at the telephoto end with respect to the wide-angle end, fm (fm=$\sqrt{(fw \cdot ft)}$) denotes a focal length of the entire zoom lens at a middle zoom position, bfm denotes an air-equivalent optical path length from a surface of the fifth lens unit L5 located closest to the image side (a surface having a refractive power) to the image plane at the middle zoom position, and bft denotes an air-equivalent optical path length from a surface of the fifth lens unit L5 located closest to the image side (a surface having a refractive power) to the image plane at the telephoto end.

The following condition can be satisfied:

$$-0.7 < f2/\sqrt{(fw \cdot ft)} < -0.2 \quad (1)$$

The condition (1) is concerned with achieving a high zoom ratio for the zoom lens by appropriately selecting the focal length of the second lens unit L2. If the focal length of the second lens unit L2 becomes short exceeding the lower limit of the condition (1), a high zoom ratio can be achieved with a small movement stroke, but aberration occurring due to an increase in refractive power increases, which is difficult to correct.

If the focal length of the second lens unit L2 becomes long exceeding the upper limit of the condition (1), it is necessary to increase the amount of movement of each lens unit to achieve a high zoom ratio. In this case, it is difficult to achieve a small-sized zoom lens.

It is further useful if the zoom lens according to an exemplary embodiment satisfies one or more of the following conditions:

$$1.5 < \beta2/\beta3 < 9.0 \quad (2)$$

$$-7.0 < m1/m2 < -1.0 \quad (3)$$

$$1.2 < bfm/bft < 3.0 \quad (4)$$

Each exemplary embodiment can achieve an effect corresponding to each condition by satisfying the same.

A technical significance of each condition is described below.

The condition (2) is concerned with a variable magnification allocation of the second lens unit L2 and the third lens unit L3. In the zoom type of each exemplary embodiment, the second lens unit L2 mainly performs variable magnification. If a variable magnification allocation of the second lens unit L2 becomes small exceeding the lower limit of the condition (2), it becomes difficult to achieve a high zoom ratio.

On the other hand, if a variable magnification allocation of the second lens unit L2 becomes large exceeding the upper limit of the condition (2), the variable magnification effect by the second lens unit L2 becomes too high. This is not useful because, in this case, variation of aberration occurring during zooming and sensitivity to decentering may increase.

The condition (3) is concerned with an appropriate ratio of the amount of movement of the first lens unit L1 to that of the second lens unit L2 during zooming. If the lower limit of the condition (3) is exceeded, the amount of movement of the second lens unit L2 becomes too large compared to that of the first lens unit L1. In this case, the distance between the surface of the second lens unit L2 located closest to the object side and the aperture stop SP becomes large at the wide-angle end. Accordingly, the position of the entrance pupil comes close to the image side.

As a result, the vertical position (height) of the incident off-axis ray becomes very high near the wide-angle end. Accordingly, the front lens diameter may increase. Thus, it becomes difficult to achieve a small-sized zoom lens.

If the upper limit of the condition (3) is exceeded, the amount of movement of the first lens unit L1 becomes too large. Accordingly, the vertical position (height) of the incident off-axis ray becomes very high at the telephoto end. In this case, the front lens diameter increases, which is not useful.

The condition (4) is concerned with an appropriate interval between the fifth lens unit L5 and the image plane.

It is useful that a sufficiently wide interval between the fourth lens unit L4 and the fifth lens unit L5 is secured near the telephoto end to secure a traveling amount of each lens unit so as to achieve a high zoom ratio.

If the interval between the fourth lens unit L4 and the fifth lens unit L5 is simply increased, the entire length of the zoom lens may increase. In this regard, it is useful that the fifth lens unit L5 moves towards the object side in the middle zooming range and moves towards the image side near the telephoto end.

The upper limit value and the lower limit value of the condition (4) define a condition for appropriately downsizing (reducing the entire length of) the zoom lens while achieving a high zoom ratio. If the lower limit of the condition (4) is exceeded, it becomes difficult to secure a sufficient amount of movement of each lens unit during focusing on a close object. In this case, with respect to the variable magnification allocation of the fifth lens unit L5, the variable magnification effect of the fifth lens unit L5 may be reduced. This is not useful in achieving a high zoom ratio.

On the other hand, if the upper limit of the condition (4) is exceeded, although it is useful in achieving a high zoom ratio, sensitivity to focusing may decrease. As a result, in this case, it becomes difficult to correct variation of focusing occurring due to part tolerance or temperature change with the fifth lens unit L5.

In an exemplary embodiment, in order to achieve a high zoom ratio while effectively correcting aberration and reducing variation of aberration occurring during zooming, it is further useful to set the range of the values in the conditions (1) through (4) as follows:

$$-0.7 < f2/\sqrt{(fw \cdot ft)} < -0.25 \quad (1a)$$

$$2.0 < \beta2/\beta3 < 7.0 \quad (2a)$$

$$-5.0 < m1/m2 < -1.8 \quad (3a)$$

$$1.3 < bfm/bft < 2.5 \quad (4a).$$

With the above-described configuration, an exemplary embodiment can achieve a small-sized zoom lens having a high zoom ratio, whose entire lens length is short, by appropriately setting the amount of movement of each lens unit during zooming and the refractive power of each lens unit.

In particular, an exemplary embodiment having the above-described configuration can achieve a zoom lens having a high optical performance over the entire zooming range from the wide-angle end to the telephoto end.

Hereinbelow, numerical examples (1) through (4) of zoom lenses corresponding to the first through fourth exemplary embodiments of the present invention are set forth. In each numerical example, "i" denotes the order of an optical surface from the object side, "ri" denotes a radius of curvature of the i-th lens surface, "di" denotes a lens thickness or an air space between the i-th surface and the (i+1)-th surface, "ni" and "vi" respectively denote a refractive index and an Abbe number of the material of the i-th optical member with respect to d-line light.

The aspheric shape is expressed as follows:

$$x = (h^2/R)/[1 + [1-(1+k)(h/R)^2]^{1/2}] + Bh^4 + Ch^6 + Dh^8 + Eh^{10}$$

where "k" denotes eccentricity (conical coefficient), "B", "C", "D", and "E" denote aspheric coefficients, "x" denotes a displacement from a surface vertex along the optical axis in a position at a height "h" from the optical axis, and "R" denotes a paraxial radius of curvature.

Furthermore, "E-Z" denotes "$10^{-Z}$". In addition, two surfaces closest to the image side represent an optical block, such as a filter or a face plate.

In addition, the relationship between each condition and each numerical example is set forth in Table 1. "BF" denotes a distance from a surface closest to the image plane to the image plane.

Numerical Example 1
Unit: mm

| | | | |
|---|---|---|---|
| r1 = 70.9695 | d1 = 1.300 | nd1 = 1.806100 | vd1 = 33.3 |
| r2 = 32.9073 | d2 = 4.500 | nd2 = 1.496999 | vd2 = 81.5 |
| r3 = −111.7649 | d3 = 0.100 | | |
| r4 = 26.7420 | d4 = 2.400 | nd3 = 1.603112 | vd3 = 60.6 |
| r5 = 52.6149 | d5 = Variable | | |
| r6 = 28.2339 | d6 = 0.700 | nd4 = 1.882997 | vd4 = 40.8 |
| r7 = 6.1390 | d7 = 2.600 | | |
| r8 = −22.7407 | d8 = 0.600 | nd5 = 1.696797 | vd5 = 55.5 |
| r9 = 23.8455 | d9 = 0.400 | | |
| r10 = 12.0313 | d10 = 1.700 | nd6 = 1.922860 | vd6 = 18.9 |
| r11 = 37.6285 | d11 = Variable | | |
| r12 = Stop | d12 = 1.500 | | |
| r13 = 13.8130 | d13 = 2.000 | nd7 = 1.693500 | vd7 = 53.2 |
| r14* = −95.8833 | d14 = 3.000 | | |
| r15 = 51.5950 | d15 = 0.600 | nd8 = 1.846660 | vd8 = 23.9 |
| r16 = 10.7382 | d16 = 0.272 | | |
| r17 = 11.7596 | d17 = 1.700 | nd9 = 1.603112 | vd9 = 60.6 |
| r18 = −18.7628 | d18 = Variable | | |
| r19 = 29.5071 | d19 = 1.200 | nd10 = 1.761821 | vd10 = 26.5 |
| r20 = 51.5358 | d20 = 0.600 | nd11 = 1.603112 | vd11 = 60.6 |
| r21 = 10.0344 | d21 = Variable | | |
| r22 = 18.6244 | d22 = 3.200 | nd12 = 1.804000 | vd12 = 46.6 |
| r23 = −12.1545 | d23 = 0.600 | nd13 = 1.805181 | vd13 = 25.4 |
| r24 = −54.2790 | d24 = Variable | | |
| r25 = ∞ | d25 = 1.200 | nd14 = 1.516330 | vd14 = 64.1 |
| r26 = ∞ | d26 = BF | | |

Aspheric Coefficients

| | | | |
|---|---|---|---|
| r14 | k = −1.41507E+03 | B = −5.53469E−05 | C = 7.53066E−06 |
| | D = −1.49270E−07 | | |

Various Data
Zoom Ratio: 14.75

| | Wide-Angle End | Middle Position | Telephoto End |
|---|---|---|---|
| Focal Length | 6.10 | 23.40 | 89.99 |
| F-number | 2.90 | 3.26 | 4.29 |
| Angle of View | 30.3 | 8.7 | 2.3 |
| Image Height | 3.6 | 3.6 | 3.6 |
| Lens Total Length | 67.99 | 82.94 | 98.99 |
| BF | 8.27 | 14.63 | 6.14 |
| d5 | 0.70 | 23.50 | 38.58 |
| d11 | 19.78 | 3.83 | 1.53 |
| d18 | 1.50 | 3.55 | 3.65 |
| d21 | 8.76 | 8.45 | 20.13 |
| d24 | 5.58 | 11.94 | 3.44 |

Lens Unit Data

| Lens Unit | Starting Surface | Focal Length |
|---|---|---|
| 1 | r1 | 56.05 |
| 2 | r6 | −8.53 |
| 3 | r12 | 14.05 |
| 4 | r19 | −27.98 |
| 5 | r22 | 17.68 |

Numerical Example 2
Unit: mm

| | | | |
|---|---|---|---|
| r1 = 37.4429 | d1 = 1.100 | nd1 = 1.805181 | vd1 = 25.4 |
| r2 = 24.2372 | d2 = 3.300 | nd2 = 1.487490 | vd2 = 70.2 |
| r3 = 110.4237 | d3 = 0.200 | | |

-continued

Numerical Example 2
Unit: mm

| | | | |
|---|---|---|---|
| r4 = 32.7375 | d4 = 2.500 | nd3 = 1.696797 | vd3 = 55.5 |
| r5 = 153.2020 | d5 = Variable | | |
| r6 = 26.3687 | d6 = 0.800 | nd4 = 1.804000 | vd4 = 46.6 |
| r7 = 6.5704 | d7 = 3.89340 | | |
| r8 = −18.9046 | d8 = 0.700 | nd5 = 1.603112 | vd5 = 60.6 |
| r9 = 26.4998 | d9 = 0.700 | | |
| r10 = 13.7742 | d10 = 1.600 | nd6 = 1.922860 | vd6 = 18.9 |
| r11 = 30.6924 | d11 = Variable | | |
| r12 = Stop | d12 = 2.200 | | |
| r13* = 9.2003 | d13 = 3.000 | nd7 = 1.583126 | vd7 = 59.4 |
| r14 = −61.1241 | d14 = 2.400 | | |
| r15 = 25.9673 | d15 = 0.700 | nd8 = 1.846660 | vd8 = 23.9 |
| r16 = 8.7391 | d16 = 0.800 | | |
| r17 = 25.1623 | d17 = 2.000 | nd9 = 1.487490 | vd9 = 70.2 |
| r18 = −21.3178 | d18 = Variable | | |
| r19 = 38.4933 | d19 = 1.000 | nd10 = 1.487490 | vd10 = 70.2 |
| r20 = 22.0000 | d20 = Variable | | |
| r21 = 13.4000 | d21 = 2.000 | nd11 = 1.487490 | vd11 = 70.2 |
| r22 = −175.1720 | d22 = Variable | | |
| r23 = ∞ | d23 = 0.800 | nd12 = 1.498310 | vd12 = 65.1 |
| r24 = ∞ | d24 = BF | | |

Aspheric Coefficients r13  k = −2.49846  B = 2.27368E-4  C = −6.59585E-7
D = −9.99386E-8
E = 3.92484E-9

Various Data
Zoom Ratio: 13.33

| | Wide-Angle End | Middle Position | Telephoto End |
|---|---|---|---|
| Focal Length | 6.00 | 21.90 | 79.99 |
| F-number | 3.34 | 3.84 | 4.95 |
| Angle of View | 30.9 | 9.3 | 2.6 |
| Image Height | 3.6 | 3.6 | 3.6 |
| Lens Total Length | 69.63 | 77.05 | 89.11 |
| BF | 10.62 | 15.65 | 7.45 |
| d5 | 0.80 | 18.73 | 30.24 |
| d11 | 24.53 | 7.94 | 1.69 |
| d18 | 2.16 | 2.31 | 5.57 |
| d20 | 2.63 | 3.73 | 15.27 |
| d22 | 5.10 | 10.13 | 1.92 |

Lens Unit Data

| Lens Unit | Starting Surface | Focal Length |
|---|---|---|
| 1 | r1 | 48.43 |
| 2 | r6 | −9.05 |
| 3 | r12 | 17.91 |
| 4 | r19 | −107.46 |
| 5 | r21 | 25.62 |

Numerical Example 3
Unit: mm

| | | | |
|---|---|---|---|
| r1 = 75.6161 | d1 = 1.900 | nd1 = 1.806100 | vd1 = 33.3 |
| r2 = 38.4904 | d2 = 5.500 | nd2 = 1.496999 | vd2 = 81.5 |
| r3 = 1574.3184 | d3 = 0.200 | | |
| r4 = 40.1987 | d4 = 4.300 | nd3 = 1.603112 | vd3 = 60.6 |
| r5 = 195.3611 | d5 = Variable | | |
| r6 = 43.9723 | d6 = 1.000 | nd4 = 1.882997 | vd4 = 40.8 |
| r7 = 10.3266 | d7 = 2.700 | | |
| r8 = 25.5214 | d8 = 0.850 | nd5 = 1.834807 | vd5 = 42.7 |
| r9 = 10.7219 | d9 = 3.600 | | |
| r10 = −23.5964 | d10 = 0.800 | nd6 = 1.834807 | vd6 = 42.7 |
| r11 = −171.2663 | d11 = 0.116 | | |

-continued

Numerical Example 3
Unit: mm

| | | | |
|---|---|---|---|
| r12 = 21.7930 | d12 = 2.250 | nd7 = 1.922860 | vd7 = 18.9 |
| r13 = 487.0594 | d13 = Variable | | |
| r14 = Stop | d14 = Variable | | |
| r15* = 12.0562 | d15 = 3.450 | nd8 = 1.583126 | vd8 = 59.4 |
| r16 = −82.0366 | d16 = 2.800 | | |
| r17 = 42.0042 | d17 = 1.150 | nd9 = 1.603420 | vd9 = 38.0 |
| r18 = 12.5862 | d18 = 0.300 | | |
| r19 = 21.2243 | d19 = 0.800 | nd10 = 2.003300 | vd10 = 28.3 |
| r20 = 8.5720 | d20 = 2.150 | nd11 = 1.719995 | vd11 = 50.2 |
| r21 = −58.7695 | d21 = Variable | | |
| r22 = 55.2648 | d22 = 1.000 | nd12 = 1.761821 | vd12 = 26.5 |
| r23 = 69.9209 | d23 = 0.600 | nd13 = 1.603112 | vd13 = 60.6 |
| r24 = 18.0000 | d24 = Variable | | |
| r25 = 20.2436 | d25 = 4.000 | nd14 = 1.772499 | vd14 = 49.6 |
| r26 = −9.8847 | d26 = 0.600 | nd15 = 1.806100 | vd15 = 33.3 |
| r27 = −50.8951 | d27 = Variable | | |
| r28 = ∞ | d28 = 0.800 | nd16 = 1.516330 | vd16 = 64.1 |
| r29 = ∞ | d29 = BF | | |

Aspheric Coefficients r15  k = 2.38663E-01  B = −9.34063E-05  C = −4.27892E-07
D = 3.73118E-08  E = −1.75451E-09

Various Data
Zoom Ratio: 17.48

| | Wide-Angle End | Middle Position | Telephoto End |
|---|---|---|---|
| Focal Length | 5.15 | 21.52 | 89.99 |
| F-number | 2.87 | 3.85 | 5.22 |
| Angle of View | 36.8 | 10.1 | 2.4 |
| Image Height | 3.9 | 3.9 | 3.9 |
| Lens Total Length | 92.73 | 102.23 | 125.15 |
| BF | 10.53 | 17.93 | 10.75 |
| d5 | 0.90 | 25.33 | 46.76 |
| d13 | 25.63 | 5.06 | 1.76 |
| d14 | 10.21 | 3.52 | 1.78 |
| d21 | 1.00 | 4.56 | 13.30 |
| d24 | 4.40 | 5.77 | 10.74 |
| d27 | 8.00 | 15.39 | 8.22 |

Lens Unit Data

| Lens Unit | Starting Surface | Focal Length |
|---|---|---|
| 1 | r1 | 70.34 |
| 2 | r6 | −10.20 |
| 3 | r15 | 19.96 |
| 4 | r22 | −46.37 |
| 5 | r25 | 20.27 |

Numerical Example 4
Unit: mm

| | | | |
|---|---|---|---|
| r1 = 129.3681 | d1 = 3.000 | nd1 = 1.846660 | vd1 = 23.9 |
| r2 = 76.8780 | d2 = 7.500 | nd2 = 1.583126 | vd2 = 59.4 |
| r3 = 3331.9206 | d3 = 0.200 | | |
| r4 = 74.1874 | d4 = 4.500 | nd3 = 1.696797 | vd3 = 55.5 |
| r5 = 138.3490 | d5 = Variable | | |
| r6 = 52.4076 | d6 = 1.500 | nd4 = 1.834807 | vd4 = 42.7 |
| r7 = 13.9045 | d7 = 7.800 | | |
| r8 = −96.1039 | d8 = 1.100 | nd5 = 1.772499 | vd5 = 49.6 |
| r9 = 43.8328 | d9 = 0.700 | | |
| r10 = 23.0329 | d10 = 4.400 | nd6 = 1.846660 | vd6 = 23.9 |
| r11 = −166.9463 | d11 = 1.100 | nd7 = 1.834807 | vd7 = 42.7 |
| r12 = 40.9356 | d12 = Variable | | |
| r13 = Stop | d13 = 2.850 | | |

-continued

Numerical Example 4
Unit: mm

| | | | |
|---|---|---|---|
| r14 = 55.4646 | d14 = 2.600 | nd8 = 1.696797 | vd8 = 55.5 |
| r15 = −37.4229 | d15 = 0.500 | | |
| r16 = 143.4269 | d16 = 3.400 | nd9 = 1.603112 | vd9 = 60.6 |
| r17 = −18.5766 | d17 = 0.800 | nd10 = 1.846660 | vd10 = 23.9 |
| r18 = −52.0513 | d18 = Variable. | | |
| r19* = −16.4692 | d19 = 2.500 | nd11 = 1.688931 | vd11 = 31.1 |
| r20 = −12.3790 | d20 = 1.000 | nd12 = 1.516330 | vd12 = 64.1 |
| r21 = 202.3067 | d21 = Variable | | |
| r22 = 19.1851 | d22 = 5.000 | nd13 = 1.696797 | vd13 = 55.5 |
| r23 = −43.2878 | d23 = 0.200 | | |
| r24 = 15.6598 | d24 = 5.000 | nd14 = 1.496999 | vd14 = 81.5 |
| r25 = −19.3663 | d25 = 0.800 | nd15 = 1.806100 | vd15 = 33.3 |
| r26 = 18.4800 | d26 = 1.300 | | |
| r27 = −180.4304 | d27 = 2.400 | nd16 = 1.583126 | vd16 = 59.4 |
| r28* = −51.6191 | d28 = Variable | | |
| r29 = ∞ | d29 = 3.500 | nd17 = 1.516330 | vd17 = 64.2 |
| r30 = ∞ | d30 = BF | | |

Aspheric Coefficients

| | | |
|---|---|---|
| r19 k = 1.48433E−1<br>D = −7.67521E−9 | B = 1.54153E−5 | C = 3.68917E−7 |
| r28 k = −7.84496E+1<br>D = −1.13419E−9 | B = 5.99482E−5 | C = 5.10736E−7 |

Various Data
Zoom Ratio: 12.11

| | Wide-Angle End | Middle Position | Telephoto End |
|---|---|---|---|
| Focal Length | 7.44 | 25.87 | 90.17 |
| F-number | 2.50 | 3.10 | 3.60 |
| Angle of View | 36.5 | 12.0 | 3.5 |
| Image Height | 5.5 | 5.5 | 5.5 |
| Lens Total Length | 128.58 | 148.52 | 192.40 |
| BF | 11.59 | 14.85 | 10.57 |
| d5 | 1.00 | 39.98 | 85.65 |
| d12 | 40.33 | 9.34 | 1.80 |
| d18 | 1.29 | 14.03 | 22.87 |
| d21 | 14.22 | 10.17 | 11.35 |
| d28 | 3.70 | 6.96 | 2.68 |

Lens Unit Data

| Lens Unit | Starting Surface | Focal Length |
|---|---|---|
| 1 | r1 | 135.38 |
| 2 | r6 | −17.77 |
| 3 | r13 | 26.64 |
| 4 | r19 | −33.58 |
| 5 | r22 | 21.41 |

TABLE 1

| | Numerical Example | | | |
|---|---|---|---|---|
| | 1 | 2 | 3 | 4 |
| Condition (1) | −0.36 | −0.41 | −0.47 | −0.69 |
| Condition (2) | 6.26 | 4.98 | 3.08 | 2.23 |
| Condition (3) | −4.51 | −1.95 | −2.41 | −3.06 |
| Condition (4) | 2.38 | 2.10 | 1.67 | 1.40 |

An exemplary embodiment of a digital still camera (image pickup apparatus) that uses a zoom lens according to an exemplary embodiment of the present invention as a photographic optical system is described below with reference to FIG. 13.

Figure 13:
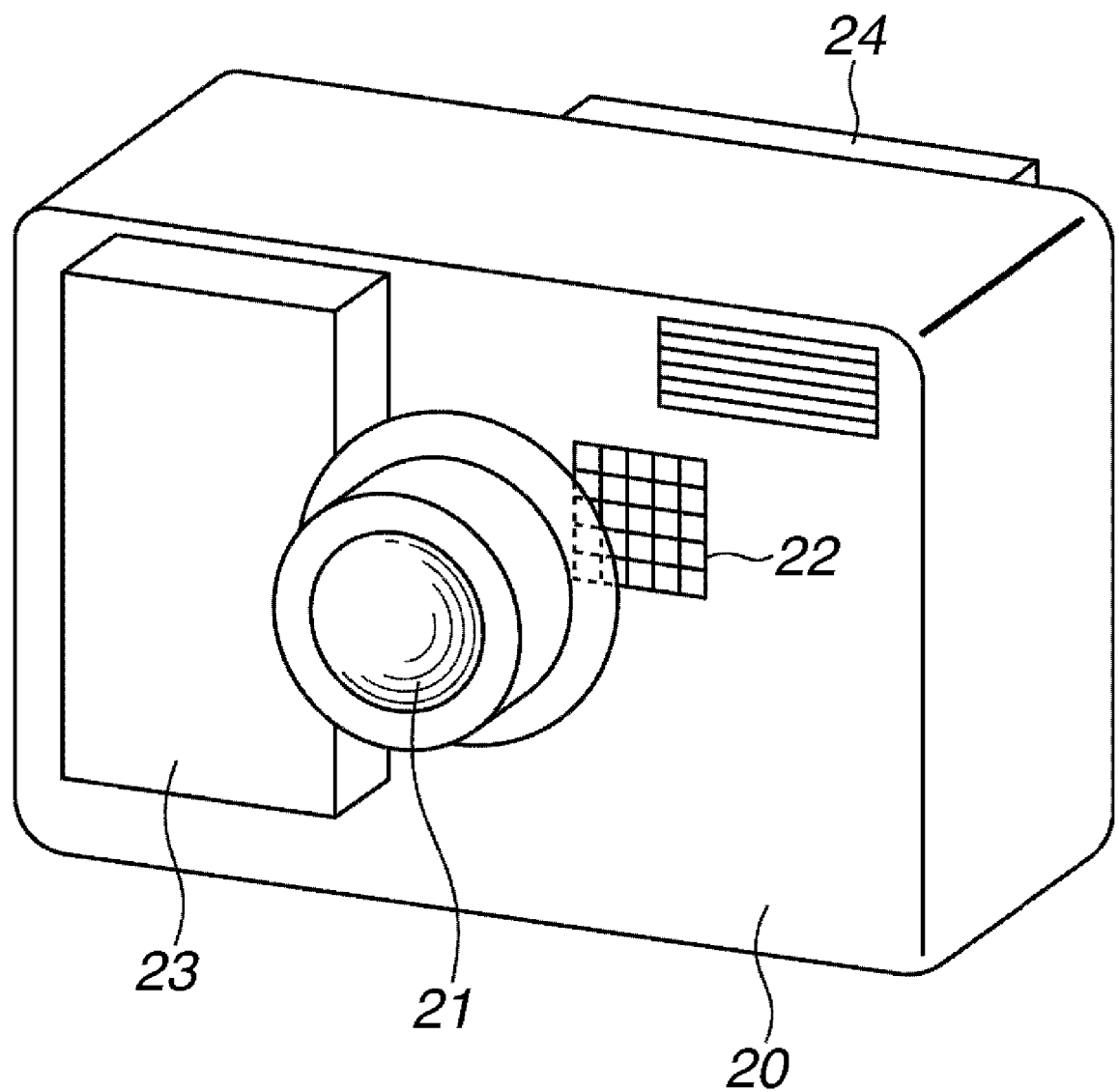
FIG. 13 illustrates components of an image pickup apparatus according to an exemplary embodiment of the present invention.

Referring to FIG. 13, the digital still camera includes a camera body 20, a photographic optical system 21 that includes a zoom lens according to an exemplary embodiment of the present invention, and a solid-state image sensor (photoelectrical conversion element) 22, such as a CCD sensor or a CMOS sensor, that receives an object image formed by the photographic optical system 21. The digital still camera further includes a memory 23 configured to record information corresponding to an object image photoelectrically converted by the solid-state image sensor 22. The digital still camera further includes a viewfinder 24 that includes a liquid crystal display panel configured to allow a user to observe an object image formed on the solid-state image sensor 22.

As described above, the zoom lens according to an exemplary embodiment of the present invention can be applied to an image pickup apparatus, such as a digital still camera, to implement a small-sized image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-287273 filed Nov. 5, 2007, which is hereby incorporated by reference herein in its entirety.

What is claimed is:

1. A zoom lens comprising, in order from an object side to an image side:
a first lens unit having a positive refractive power and configured to move along an optical axis during zooming;
a second lens unit having a negative refractive power and configured to move with a locus convex towards the image side during zooming;
a third lens unit having a positive refractive power; and
a fourth lens unit having a negative refractive power,
wherein the first lens unit is located closer to the object side at a telephoto end than at a wide-angle end,
wherein the second lens unit is located closer to the image side at the telephoto end than at the wide-angle end, and
wherein a focal length of the second lens unit (f2), a focal length of the zoom lens at the wide-angle end (fw), and a focal length of the zoom lens at the telephoto end (ft) satisfy the following condition:

$-0.7 < f2/\sqrt{(fw \cdot ft)} < -0.2$.

2. The zoom lens according to claim 1, wherein a ratio of an imaging magnification of the second lens unit at the telephoto end to an imaging magnification of the second lens unit at the wide-angle end (β2) and a ratio of an imaging magnification of the third lens unit at the telephoto end to an imaging magnification of the third lens unit at the wide-angle end (β3) satisfy the following condition:

$1.5 < \beta2/\beta3 < 9.0$.

3. The zoom lens according to claim 1, wherein an amount of movement of the first lens unit during zooming from the wide-angle end to the telephoto end (m1) and an amount of movement of the second lens unit during zooming from the wide-angle end to the telephoto end (m2) satisfy the following condition:

$-7.0 < m1/m2 < -1.0$.

4. The zoom lens according to claim 1, further comprising a fifth lens unit having a positive refractive power and located closer to the image side than the fourth lens unit.

5. The zoom lens according to claim 4, wherein the fifth lens unit is configured to move with a locus convex towards the object side during zooming.

6. The zoom lens according to claim 4, wherein, when a focal length of the zoom lens at a middle zoom position (fm) is defined as $fm=\sqrt{(fw \cdot ft)}$, an air-equivalent optical path length from a surface of the fifth lens unit located closest to the image side to an image plane at the middle zoom position (bfm) and an air-equivalent optical path length from a surface of the fifth lens unit located closest to the image side to the image plane at the telephoto end (bft) satisfy the following condition:

$$1.2 < bfm/bft < 3.0.$$

7. The zoom lens according to claim 1, wherein the first through fourth lens units are configured to move during zooming.

8. The zoom lens according to claim 1, wherein the first lens unit is configured to move with a locus convex towards the image side during zooming.

9. The zoom lens according to claim 1, further comprising a stop located between the second lens unit and the third lens unit and configured to move independently from each of the first through fourth lens units during zooming.

10. The zoom lens according to claim 1, wherein the zoom lens is configured to form an image on a solid-state image sensor.

11. An image pickup apparatus comprising:
the zoom lens according to claim 1; and
a solid-state image sensor configured to receive an image formed by the zoom lens.

* * * * *